United States Patent [19]

Manor et al.

[11] Patent Number: 4,836,995
[45] Date of Patent: Jun. 6, 1989

[54] PROCESS FOR THE MANUFACTURE OF MONOPOTASSIUM PHOSPHATE

[75] Inventors: Shalom Manor, Kiryat Haim; Grigori Pipko; Adrian Langham, both of Haifa; Nitza Friedman, Kiryat; Amalia Steiner, Haifa, all of Israel

[73] Assignee: Haifa Chemicals Ltd., Haifa, Israel

[21] Appl. No.: 277,462

[22] Filed: Nov. 23, 1988

Related U.S. Application Data

[63] Continuation of Ser. No. 50,536, May 15, 1987, abandoned.

[30] Foreign Application Priority Data

Jun. 4, 1986 [IL] Israel .......................................... 79020

[51] Int. Cl.$^4$ ........................ C01B 15/16; C01B 25/26
[52] U.S. Cl. ..................................... 423/309; 423/313
[58] Field of Search ................................. 423/309, 313

[56] References Cited

U.S. PATENT DOCUMENTS

| | | | |
|---|---|---|---|
| 2,902,341 | 9/1959 | Baniel et al. | 423/309 |
| 3,328,118 | 6/1967 | Sadakura | 423/309 |
| 3,443,889 | 5/1969 | Clifford | 423/309 |
| 3,661,513 | 5/1972 | Barker | 423/309 |

FOREIGN PATENT DOCUMENTS

| | | | |
|---|---|---|---|
| 713481 | 7/1965 | Canada | 423/309 |
| 1080661 | 8/1967 | United Kingdom | 423/309 |

Primary Examiner—John Doll
Assistant Examiner—Wayne A. Langel
Attorney, Agent, or Firm—Morgan & Finnegan

[57] ABSTRACT

The present invention relates to a process for the manufacture of monopotassium phosphate using solvent extraction technique. According to the invention, the reaction occurs between phosphoric acid and potassium chloride at a temperature between 0 and 100 degrees C. in the presence of an organic solvent comprising a long chain primary amine having between 6 to 28 carbon atoms. The lower phase containing monopotassium phosphate and dipotassium phosphate is acidulated with a solution of phosphoric acid to a pH in the range of between 2 to 6, whereby crystallized monopotassium phosphate is obtained and separated. The upper phase which contains the organic solvent, aminehydrochloric acid as well as most of the impurities originally present in the starting reagents, is treated with a base at a temperature in the range of 20 to 100 degrees C. whereby the amine is regenerated and recycled to the process. Typical examples of suitable bases are calcium oxide, calcium carbonate or mixtures thereof. The monopotassium phosphate obtained is characterized by its high purity.

13 Claims, No Drawings

PROCESS FOR THE MANUFACTURE OF MONOPOTASSIUM PHOSPHATE

This is a continuation of co-pending application Ser. No. 050,536, filed on May 15, 1987, abandoned.

BACKGROUND OF THE INVENTION

The present invention relates to a new process for the manufacture of monopotassium phosphate. More particularly, the present invention relates to a new process for the manufacture of monopotassium phosphate using the raw material KCl as a source of potassium.

The direct neutralization of phosphoric acid by potassium hydroxide or carbonate is readily seen to be uneconomic, if the product is to be used as a fertilizer and therefore most of the known methods are based on the utilization of potassium chloride as starting material.

The known methods for the manufacture of monopotassium phosphate, from phosphoric acid and potassium chloride, are based on the thermal reaction between the two reagents in which the following reaction occurs:

$$H_3PO_4 + KCL \rightarrow KH_2PO_4 + HCl$$

However the yield of the said reaction is poor unless a large excess of phosphoric acid is used, in which case the solid product obtained is a double salt: $KH_2PO_4 \cdot H_3PO_4$ which requires a further step for its decomposition and recovery of the excess of phosphoric acid. A further drawback in the thermal process is the need for pure starting materials, as all impurities present in the feed potassium chloride and phosphoric acid are carried through the solid product. Lastly, the thermal process requires temperatures above 160 degrees C., which cause problems of corrosion and could lead to the formation of insoluble potassium metaphosphate, unless special precautions are taken such as that proposed in the U.S. Pat. No. 3,393,044 wherein organic substances are added to the reaction mixture so as to expel the hydrogen chloride at a lower temperature. However, even with that improvement the reaction temperature remains in the range of 120 to 160 degrees C., so that the corrosion problems remain.

Another approach for the manufacture of monopotassium phosphate at ambient temperature, was described in the U.S. Pat. No. 2,902,341 (Baniel et. al.), wherein potassium chloride is reacted with large excess of phosphoric acid and the mixture of hydrochloric acid (resulted in the reaction) and the excess of phosphoric acid are removed by solvent extraction using water immiscible organic solvents. The monopotassium phosphate is crystallized from the aqueous solution resulting after the removal of the acids. The implementation of this process on a commercial scale is questionable, particularly in view of the high costs involved concerning the organic solvents and energy required to separate phosphoric acid from the hydrochloric acid.

According to U.S. Pat. No. 3,661,513 a process is disclosed for the manufacture of monopotassium phosphate from phosphoric acid and potassium chloride, wherein the reaction mixture is treated with an immiscible secondary amine to selectively extract the chloride ion. The solution recovered has a reduced anion content and a pH of about 7. On evaporating the so-treated phosphate solution, solid monopotassium phosphate can be recovered. The advantage mentioned to exist in this method is that the product is substantially free of contaminating anions without the use of the high temperatures mentioned by the prior art.

SUMMARY OF THE INVENTION

It is an object of the present invention to provide a simple process for the manufacture of monopotassium phosphate. It is another object of the present invention to provide a simple process for the manufacture of monopotassium phosphate which does not require temperatures above 100 degrees C. It is yet another object of the present invention to provide a simple process for the manufacture of monopotassium phosphate, without involving the formation of double salt monopotassium phosphate-phosphoric acid. Thus, the invention consists of a process for the manufacture of monopotassium phosphate which comprises the steps of: (a) reacting phosphoric acid with potassium chloride in the presence of an organic solvent comprising a long chain primary amine having between 6 to 28 carbon atoms, at a temperature between 0 and 100 degrees C.; (b) separating the lower aqueous phase comprising mono- and dipotassium phosphate salts; and (c) acidulating the phosphate salts by a solution of phosphoric acid to a pH in the range of between 2 to 6, whereby crystallized monopotassium phosphate is obtained and separated. The upper layer, which contains the organic solvent, amine-hydrochloric acid and impurities originally present in the starting reagents, is treated with a base, which economically can be a calcium constituent selected from calcium oxide, calcium carbonate or mixtures thereof, whereby the free amine is regenerated and recycled in the reaction of the process. The regeneration is generally carried out at a temperature in the range of between 20 to 100 degrees C. Particularly suitable is the regeneration with calcium carbonate, known by its abundancy and relatively low cost, the temperature in this case being in the range of between 60 to 100 degrees C.

One of the advantages of the process is the fact that the monopotassium phosphate is obtained in a substantially pure form, although the starting materials are of commercial grade, i.e. wet process phosphoric acid (so called green acid, merchant acid or fertilizer acid) which contains a number of metallic impurities, as well as fluorides and sulfate, and commercial potash. This is a result of the fact that impurities are removed, to a certain extent, during the reaction itself, whereby the amine does extract them so that purified phosphoric acid will react with the potassium chloride in step (a) of the process.

DESCRIPTION OF THE INVENTION

The reactions involved in step (a) of the process can be illustrated by the following equations:

$$KCl + H_3PO_4 \rightarrow KH_2PO_4 + HCl \quad (1)$$

$$2KCl + H_3PO_4 \rightarrow K_2HPO_4 + 2HCl \quad (2)$$

As appears from the above equations, a mixture of monopotassium phosphate and dipotassium phosphate is obtained, the ratio between them being mainly a function of the ratio between the two reactants: phosphoric acid and potassium chloride. Generally, the preferred ratio is between 1 mole phosphoric acid to 1.0 to 2.5 moles of potassium chloride. Both reactions proceed smoothly, in the presence of the organic solvent containing the above mentioned groups of amines. The hydrogen chloride produced thereto, will combine with the amine producing the corresponding amine-hydrochloric acid.

The phosphoric acid to be reacted with the potassium chloride, can come from any convenient source and its composition can vary over a rather substantial range. The concentration of phosphoric acid can similarly vary over a considerable range; thus it can range from as low as about 5% to about 62% by weight $P_2O_5$. A 5% concentration is somewhat diluted and requires additional processing to concentrate it. Phosphoric acid with a $P_2O_5$ concentration above 62% is not readily available and although useful for the process according to the present invention is not preferred. It is generally preferred to employ a phosphoric acid having a concentration of from about 15% to 35% by weight $P_2O_5$. In this range of concentration the agitation of the reagents is also optimal.

The potassium chloride should be added as a concentrated solution and preferably in a solid form, to minimize the presence of water which might interfere the crystallization process of the monopotassium phosphate.

The temperature for carrying out the reaction between the phosphoric acid and potassium chloride (in the presence of the organic solvent) may be selected in a broad range of between 0 and 100 degrees C. Temperatures above 100 degrees C., are not suggested due to the problem of volatilization. The most preferred range of temperatures for carrying out the reaction is between 40 to 80 degrees C. The temperatures at the upper range will enable an easy separation between the two phases: organic and aqueous phase.

The upper layer which contains the organic solvent, amine-hydrochloric acid and impurities originally present in the starting reagents, is treated with a base which can be a calcium constituent selected from calcium oxide, calcium carbonate or mixtures thereof, whereby the amine is regenerated and recycled to the process. This regeneration is carried out generally at a temperature in the range of between 20 to 100 degrees C.

The organic solvents consist of primary amines containing between 6 and 28 carbon atoms. Generally, most of the amines are aliphatic in character, although they may be partially aromatic. In particularly preferably are the amines with branched aliphatic hydrocarbons. The amine selected should be liquid, stable and of low volatility at ambient temperature, and both the amine and its hydrochloric acid salt should be insoluble in water. The most preferred amines suitable for the process according to the present invention are those containing 18–22 carbon atoms such as Primene JMT (Trade Mark produced by Rohm Haas, U.S.A.) etc.

A variety of inert organic solvents will normally be compatible to dissolve the amine (and its hydrochloric acid), so the choice of diluent is wide. The diluent, or combination of diluents, should be immiscible with water and should be sufficiently different in density from water and from aqueous solutions of potassium phosphates so that no difficulty will arise in phase separation. In particular suitable inert solvents are aliphatic or aromatic hydrocarbons, most preferable being kerosene, alcohols and ketones.

The ratio between the amine and the inert solvent is not critical and can be selected in a broad range of between 5% to 99% (amine to inert solvent), the most preferred range being between 20% to 70% by volume. The amount of amine should be at least equivalent to the resulted hydrochloric acid from the reaction between the potassium chloride and the phosphoric acid in order to form the corresponding amine-hydrochloric salt.

It was found that by carrying out the reaction between the phosphoric acid and potassium chloride at the preferred temperatures range of between 40 to 80 degrees C., the two phases which are obtained separate easily without any entrainment, the aqueous phase consisting mainly of the two phosphate salts.

The last step of the process, the acidification of the aqueous phase with phosphoric acid is very important in order to obtain the monopotassium phosphate in its substantially pure form. It was unexpectedly found that the acidulation with phosphoric acid in order to obtain the maximum amount of monopotassium phosphate is strictly correlated to the final pH of the acidulation. It was found that at the range of pH between 2 and 6, and most preferable at the range of between 3 and 4, the maximum amount of monopotassium phosphate could be achieved. The phosphoric acid to be utilized in this acidulation may be of any source, of course its grade determining to a certain extent the purity of the final product. The concentration of the phosphoric acid may be selected from a broad range of between 5% to 62% by weight $P_2O_5$ the preferred one being between 30% to 54% by weight $P_2O_5$. In the following Table 1, are summarized the results obtained on the acidulation of an aqueous phase, obtained according to step (a) of the process of the present invention, and separated from the organic phase. The composition of the aqueous phase used in all these acidulation experiments was as follows:

6.9% monopotassium phosphate.
39.2% dipotassium phosphate.
2.8% $Cl^-$

The acidulation was performed with phosphoric acid having a concentration of 54% by weight $P_2O_5$ at a temperature of 50 degrees C., for about 20 minutes.

TABLE 1

Acidulation of an aqueous phase containing monopotassium phosphate and dipotassium phosphate with phosphoric acid (54% $P_2O_5$).

| Expt. | Amount of phosphoric acid utilized (mls) | The pH at the end of acidulation | g monopotassium phosphate/100 ml brine |
| --- | --- | --- | --- |
| 1 | 20 | 5.4 | 73.1 |
| 2 | 24 | 3.5 | 83.0 |
| 3 | 28 | 3.0 | 84.6 |
| 4 | 30 | 2.3 | 64.8 |
| 5 | 32 | 2.4 | 64.6 |
| 6 | 36 | 2.0 | 58.6 |
| 7 | 40 | 1.85 | 58.2 |
| 8 | 50 | 1.5 | 33.6 |

As appears from the above Table 1, by acidulating the aqueous phase containing monopotassium phosphate and dipotassium phosphate with phosphoric acid, the amount of monopotassium phosphate increases up to a pH value of about 3 to 4. Beyond this pH value, despite the further addition of phosphoric acid, there is a decrease of the monopotassium phosphate produced. Of course, the resulted brine is not wasted but recycled to the process, however the overall yield of monopotassium phosphate produced, decreases to some extent below a pH of 3 and quite significantly below a pH of about 2.

While the invention will now be described in connection with certain preferred embodiments in the following Examples, it will be understood that it is not intended to limit the invention to these particular embodiments. On the contrary, it is intended to cover all alternatives, modifications and equivalents as may be included within the scope of the invention as defined by the appended claims. Thus the following Examples which include preferred embodiments will serve only to illustrate the practice of this invention, it being understood that the particulars described are by way of example, without being limited thereto.

In the Examples given below, the figures are expressed in weight percentages unless otherwise mentioned.

EXAMPLE 1

The following reagents were introduced into a glass reactor provided with a stirrer:

106 g of Primene JMT (Trade Mark produced by Rohm & Haas, a primary amine, containing 18–22 carbon atoms).

96 g of dearomatized kerosene (Desol, produced by Paz, Israel).

9.6 g of phosphoric acid (36% $P_2O_5$ green acid, produced by Rotem, Israel).

15 g of potassium chloride 95% KCl, produced by Dead Sea Works Ltd., Israel).

The above reaction mixture was agitated for about 60 minutes at 60 degrees C. After the agitation was ceased, three phases were noticed:

A solid phase amounting 1.1 g, its composition being: 0.8% monopotassium phosphate; 3.7% dipotassium phosphate and $Cl^-$ 43.6%.

An organic phase, with the following composition: 0.03% $P_2O_5$ and 2.96% $Cl^-$.

An aqueous phase which contained: 10.2% monopotassium phosphate; 41.5% dipotassium phosphate and 1.5% $Cl^-$.

The aqueous phase was separated and treated with 14.8 g of phosphoric acid (54% $P_2O_5$, green acid) producing 26.8 g of monopotassium phosphate.

EXAMPLE 2

The experiment as in Example 1 was repeated with the same amounts of phosphoric acid and potassium chloride, but the organic solvent consisted of the following: 96 g of Primene JMT and 96 g amyl alcohol. The reaction was carried out under the same conditions as in Example 1, the composition of the phases being as follows:

Solid phase: 1.7% monopotassium phosphate; 4.4% dipotassium phosphate and 41.4% $Cl^-$.

Organic phase: 0.44% $P_2O_5$, and 2.73% $Cl^-$.

Aqueous phase: 14.4% monopotassium phosphate, and 44.6% dipotassium phosphate.

The aqueous phase was acidulated with 14.0 g of phosphoric acid (54% $P_2O_5$) obtaining 28.1 g of monopotassium phosphate.

EXAMPLE 3

The following reagents were introduced into a glass reactor provided with a stirrer:

50.5 g of Amine 81R (a primary amine, containing 12–14 carbon atoms, produced by Rohm & Haas, U.S.A.).

50.5 g of Desol (dearomatized kerosene).

13.5 g of green phosphoric acid (produced by Rotem, Israel).

20 g of water.

15.7 g of potassium chloride 95% KCl, produced by Dead Sea Works Ltd.).

The reaction was carried out at 70 degrees C. for about 60 minutes.

Two liquid phases were obtained and separated:

Aqueous phase containing: 6.9% monopotassium phosphate and 39.2% dipotassium phosphate and 2.8% $Cl^-$.

Organic phase with a composition of: 0.1% $P_2O_5$ and 6.25% $Cl^-$.

The aqueous phase was acidulated with 1.42 g of phosphoric acid (54% $P_2O_5$) obtaining 34.2 g of monopotassium phosphate.

EXAMPLE 4

The following reagents were introduced into a glass reactor provided with a stirrer:

32.25 g of a 20% solution of octylamine in amyl alcohol.

9.6 g of phosphoric acid (technical grade 50% $P_2O_5$ produced by Haifa Chemicals Ltd.).

15.7 g of potassium chloride 95% KCl, produced by Dead Sea Works Ltd.).

The reaction was conducted at 60 degrees C. for about 60 minutes.

Two liquid phases were obtained and separated:

An aqueous phase with a composition of 36.8% dipotassium phosphate, 5.2% monopotassium phosphate and 3.4% $Cl^-$.

An organic phase with a composition of 0.42% $P_2O_5$ and 4.7% $Cl^-$.

The aqueous phase was acidulated with 13.8 g of phosphoric acid (54% $P_2O_5$) obtaining 23.0 g of monopotassium phosphate.

EXAMPLE 5

The following reagents were introduced into a glass reactor provided with a stirrer:

96 g of green phosphoric acid (produced by Rotem, Israel 22% $P_2O_5$).

157 g of potassium chloride 95% KCl (produced by Dead Sea Works Ltd.).

1060 g of amine Primene JMT + 1060 dearomatized kerosene (Desol).

The reaction was carried out at 70 degrees C. for about 60 minutes.

Two phases were obtained and separated:

An aqueous phase with a composition of 12.1% monopotassium phosphate; 31.1% dipotassium phosphate and 2.3% $Cl^-$.

An organic phase with a composition of 0.06% $P_2O_5$ and 2.9% $Cl^-$.

The aqueous phase was treated with 138 g of a green phosphoric acid (54% $P_2O_5$ at 25 degrees C. for about twenty minutes, obtaining 256.1 g of monopotassium phosphate.

We claim:

1. A process for the manufacture of monopotassium phosphate which comprises the steps of:
   (a) reacting phosphoric acid with potassium chloride in the presence of an organic solvent comprising a long chain primary amine dissolved in an inert organic solvent, said amine having 6 to 28 carbon atoms in each chain, at a temperature in the range of 40 to 80 degrees C. to obtain two phases which separate easily without any entrainment, an upper organic phase containing the organic solvent, amine-hydrochloric acid as well as impurities present in the starting reagents, and a lower aqueous phase containing monopotassium phosphate and dipotassium phosphate salts;

(b) separating the lower aqueous phase from the upper organic phase; and (c) acidulating the phosphate salts present in said lower phase with a solution of phosphoric acid to a pH in the range of between 2 and 6, whereby crystallized monopotassium phosphate is obtained and separated.

2. A process according to claim 1, wherein the acidulation of the aqueous phase in step (c) is carried out to a pH in the range of 3 to 4.

3. A process according to claim 1, wherein the acidulation of the aqueous phase in step (c) is carried out with a phosphoric acid having a concentration in the range of between 30% to 62% by weight $P_2O_5$.

4. A process according to claim 1, wherein the long chain primary amines possess branched aliphatic hydrocarbon groups.

5. A process according to claim 4, wherein the long chain primary amines have between 12 to 22 carbon atoms in each chain.

6. A process according to claim 1, wherein said inert organic solvent is selected from aliphatic and aromatic hydrocarbons, alcohols and ketones.

7. A process according to claim 1, wherein the ratio between phosphoric acid and potassium chloride in step (a) is between 1 mole of phosphoric acid to 1.0-2.5 moles of potassium chloride.

8. A process according to claim 1, wherein the phosphoric acid used in step (a) has a concentration in the range of between 15% to 35% by weight $P_2O_5$.

9. A process according to claim 1, wherein the amine present in the reaction of step (a), is at least equivalent to the hydrochloric acid resulted in said reaction.

10. A process according to claim 1, wherein the ratio between the amine and inert organic solvent is between 20 to 70% by volume.

11. A process according to claim 1, wherein the organic upper phase resulted in step (a) is reacted with a base to regenerate the amine.

12. A process according to claim 11, wherein said base for the regeneration is calcium carbonate.

13. A process according to claim 11, wherein the temperature during the neutralization is between 60 to 100 degrees C.

* * * * *